(12) United States Patent
Donahue et al.

(10) Patent No.: US 7,459,488 B2
(45) Date of Patent: Dec. 2, 2008

(54) COMPOSITION AND PROCESS FOR RECOVERY OF SPILLED HYDROCARBONS FROM AQUEOUS ENVIRONMENTS

(75) Inventors: Pat Donahue, The Woodlands, TX (US); E. Richard Huber, Houston, TX (US); Pat L. Murray, Spring, TX (US)

(73) Assignee: Polyfoam Products, Inc., Tomball, TX (US)

( * ) Notice: Subject to any disclaimer, the term of this patent is extended or adjusted under 35 U.S.C. 154(b) by 214 days.

(21) Appl. No.: 11/366,263

(22) Filed: Mar. 2, 2006

(65) Prior Publication Data

US 2006/0199944 A1 Sep. 7, 2006

Related U.S. Application Data

(60) Provisional application No. 60/658,231, filed on Mar. 3, 2005.

(51) Int. Cl.
*C08F 6/00* (2006.01)
*C08J 9/28* (2006.01)

(52) U.S. Cl. .......................................... 521/64; 528/480

(58) Field of Classification Search .................. 521/64; 528/480
See application file for complete search history.

(56) References Cited

U.S. PATENT DOCUMENTS

| | | | |
|---|---|---|---|
| 2,948,691 A | 8/1960 | Windemuth et al. | |
| 3,706,678 A | 12/1972 | Dietrich et al. | |
| 3,719,050 A | 3/1973 | Asao et al. | |
| 3,869,385 A | 3/1975 | Stanley et al. | |
| 4,034,508 A | 7/1977 | Dedolph | |
| 4,035,951 A | 7/1977 | Dedolph | |
| 4,118,354 A | 10/1978 | Harada et al. | |
| 4,241,537 A | 12/1980 | Wood | |
| 4,246,146 A | 1/1981 | Wood et al. | |
| 4,980,072 A | 12/1990 | Augustin et al. | |
| 5,061,555 A | 10/1991 | Edenbaum et al. | |
| 5,104,909 A | 4/1992 | Grasel et al. | |
| 5,219,097 A | 6/1993 | Huber et al. | |
| 5,504,124 A | 4/1996 | Cassidy et al. | |
| 5,723,534 A | 3/1998 | Murray | |
| 5,730,880 A | 3/1998 | Gerber et al. | |
| 6,345,776 B1 | 2/2002 | Hurray et al. | |
| 6,793,098 B2 | 9/2004 | Huber et al. | |
| 2002/0040978 A1 | 4/2002 | Narayan et al. | |
| 2005/0070455 A1* | 3/2005 | Hesselroth et al. | 510/408 |

FOREIGN PATENT DOCUMENTS

| EP | 0415127 A1 | 3/1991 |
|---|---|---|
| EP | 0547765 A1 | 6/1993 |
| WO | WO 95/31402 A1 | 11/1995 |

OTHER PUBLICATIONS

Sven Uwe Keimling and Michael Bader, "*Burning Issues: Fire and Price*," Hamburg, Germany, undated.

* cited by examiner

*Primary Examiner*—Terressa M Boykin
(74) *Attorney, Agent, or Firm*—Douglas W. Rommelmann; Andrew Kurth LLP

(57) ABSTRACT

A process and polymer foam composition for removing hydrocarbon material from wanted material containing water by bringing an isocyanate-containing prepolymer and a gaseous expansion agent, with or without a diluent and/or cell control agent, into contact with the materials, allowing the composition to react with the water to form a flexible foam and removing the polymer foam obtained from the wanted material.

20 Claims, No Drawings

COMPOSITION AND PROCESS FOR RECOVERY OF SPILLED HYDROCARBONS FROM AQUEOUS ENVIRONMENTS

CROSS-REFERENCE TO RELATED APPLICATIONS

This application claims priority from U.S. Provisional Application Ser. No. 60/658,231, filed Mar. 3, 2005.

BACKGROUND OF THE INVENTION

1. Field of the Invention

The present invention relates to a composition and process for recovery of spilled hydrocarbons from aqueous environments and surrounding structures, and more particularly, by use of a polymer composition.

2. Description of the Related Art

The recovery of unwanted material, such as spilled hydrocarbons on water, sand or other structures, has been an environmental concern for many decades. Oil spilled or leaked from tankers, vessels, docks and offshore wells are just a few of the many examples that continue to threaten our environment. Spills and leaks create havoc with birds and other wildlife that inhabit the water and surrounding areas. As long as the demand for petroleum products exists, spills and leaks will continue to occur thus requiring prompt attention and clean up.

Oil spills and leaks occur on bodies of water of all types, including those containing fresh, brackish, or salt (sea) water. Recovery of oil may also be required on beaches and coastal lands. In yet other situations, it may be required to recover oil from a source, such as the side of a vessel. The unwanted material may be any hydrocarbon material, including, but not limited to, crude oil, residual fuel oils, and distilled products such as gasoline, kerosene-type jet fuel, diesel fuel, heating oil, etc. The term "oil spill" is used herein to refer to a pool or mass of oil floating on a body of water, and without distinction as to the source of the oil or the manner in which it was released.

Several processes and techniques have been used in the past to facilitate the clean up of oil spills. One such technique has been to use polyurethanes to recover spilled hydrocarbons.

U.S. Pat. No. 3,869,385 discloses spraying formulations suitable for making polyurethane foam on water or sand in order to remove oil. The '385 patent discloses a process for containing oil spills on bodies of water by applying a polyisocyanate and a polyamine to the oil spill. The resulting polymer forms a rubbery gelled mass to contain the oil by a thickening or coagulating effect.

U.S. Pat. No. 4,980,072 discloses the use of an isocyanate-terminated prepolymer for removing hydrocarbons, in particular oil, by preparing a gel. The disclosed prepolymer has an NCO value of 4.2% by weight which has been made from toluene diisocyanate and a polyether polyol which has been tipped with about 2% by weight of propylene oxide. The '072 patent further discloses that the prepolymer may be mixed with water before bringing the prepolymer into contact with the oil. In the examples, the prepolymer is combined with water and thoroughly mixed for 25 seconds before it is combined with the oil. It is believed that this premixing with water is conducted in order to achieve a certain degree of pre-reaction of the prepolymer and the water. It is further believed that without such a long mixing time, which under field conditions would be unpractically long, only unrecoverable crumbs would be obtained.

EP-415127 discloses the use of prepolymers as flocculating agents.

Application PCT/EP95/01517 discloses the use of a prepolymer, made from 4,4'-diphenylmethane diisocyanate (4,4'-MDI) and a polyol having an oxyethylene content of 50-85% by weight, for removing oil spills from water. It further discloses that the prepolymer may be brought into contact with the oil and water as a froth obtained by adding water to the prepolymer.

U.S. Pat. Nos. 5,504,124 and 5,730,880 disclose a process for removing oil from water by bringing an isocyanate-containing prepolymer into contact with the oil and water, and allowing the prepolymer to react with the water to form a flexible foam. The flexible foam with the oil is then removed from the water. The '880 patent discloses that the process for removing oil from water by using a prepolymer may be further improved by adding a certain amount of water to the prepolymer a few instants before the prepolymer is brought into contact with the oil/water. The '880 patent further discloses that use of the water: reduces the viscosity of the prepolymer and changes the surface tension to make it easier to apply the prepolymer to the oil and water; provides adequate spraying patterns (fine droplets), especially when the prepolymer and the water are mixed in a spraying gun; and produces a sufficiently high output of the prepolymer from such a spraying gun whereas without this water the output is low and the prepolymer leaves the nozzle of the gun as a jet-stream. The flexible foam, obtained after the prepolymer and water mixture have been combined with the oil and water, retains the oil very well after the foam has been removed from the water surface. The '880 patent further states that because the water is added to the prepolymer only a few instants before the prepolymer is brought into contact with the oil and water no noticeable pre-reaction takes place, particularly not when the water is applied at a temperature of 5°-35° C.

The prepolymer composition disclosed in the '880 patent is very difficult to use commercially, particularly in oil spill clean-up operations, as it is very hydroscopic and reacts quickly with moisture. As a result, dispensing systems developed for the prepolymer composition disclosed in the '880 patent could only be used one time and then had to be dismantled, cleaned and reassembled for subsequent use. Such problems have created extreme difficulties in commercially exploiting the prepolymer composition of the '880 patent. The current applicants witnessed these problems firsthand in a demonstration of the dispensing equipment following the method of spraying the mixed product as suggested in Examples 3 and 4 of the '880 patent, column 5, lines 15-32.

Assignee's U.S. Pat. No. 5,723,534 discloses the use of prepolymers in a two-part adhesive. The '534 patent incorporates the use of an isocyanate-terminated prepolymer as one component of a two-part adhesive system utilizing the hydrophilic characteristic of the prepolymer to initiate reaction of the polyurethane/latex bond.

The viscosity of the prepolymers produced from the aforementioned prior art patent disclosures is extremely high, in the range of 10,000 to 20,000 centipoises, which restricts the commercial application and use of the technology. It is desirable to have a prepolymer with a lower viscosity to enhance the commercial application and use of the technology.

It is also desirable to have a commercially viable, practical, reliable, inexpensive delivery system for applying a hydrocarbon sorbing and/or encapsulating, foamable, flexible polyurethane foam on the surface of contaminated water and surrounding structures.

BRIEF SUMMARY OF THE INVENTION

The present invention provides an improved composition and process for recovery of spilled hydrocarbons from aqueous environments and surrounding structures. The present invention includes a prepolymer composition having a lower viscosity than the aforementioned prior art disclosures, preferably a viscosity in the range of 50 to 200 centipoises.

In a preferred embodiment, the improved composition and process incorporates the chemical technology reflected in the aforementioned prior art patents with additional non-reactive viscosity modifiers or diluents and blowing agents for practical application and use of the prepolymer technology.

Preferably, the viscosity modifiers or diluents are isocyanate-compatible and water soluble. The addition of isocyanate-compatible, water soluble diluents lowers the viscosity of the prepolymer for processing without affecting the sorbing and/or encapsulating efficiency of the foamable prepolymer. Suitable diluents include propylene carbonate, glycol ether DE acetate, glycol ether EM acetate, Fyrol® DMMP (dimethyl methyl phosphonate, Akzo Nobel Functional Chemicals, LLC), Fyrol® CEF (tri(2-chloroethyl)phosphate), Fyrol® PCF (tri(2-chloroisopropyl)phosphate), triethylphosphate and others.

Further, the addition of a gaseous expansion agent or blowing agent, such as fluorocarbon, more preferably a hydrogenated fluorocarbon, enhances the ability to commercially use the prepolymer technology. The modified prepolymer may be packaged in pre-pressurized product containers for use with disposable plastic dispensers thus requiring only a water source at the time of use.

The present invention includes a process for removing hydrocarbon from water, or other material in the presence of water, by bringing an isocyanate-containing prepolymer into contact with the materials and allowing the prepolymer to react with at least part of the water to form a flexible foam. The foam obtained contains the hydrocarbon by inclusion, absorption and/or adsorption. The foam is then removed from the water or other material surface in any known way, such as by taking or pulling the foam from the water or other surface. The collected foam can be compressed to separate the hydrocarbon or used for energy recovery.

The prepolymer composition of the present invention is preferably mixed with a water stream in a static mixer of a dispensing gun. The static mixer is preferably detachable and disposable. The dispensing gun is also preferably disposable. The delivery system is a commercially viable, practical, reliable, inexpensive unit for applying a hydrocarbon sorbing and/or encapsulating, foamable, flexible polyurethane foam on the surface of contaminated water and surrounding structures.

DETAILED DESCRIPTION OF THE INVENTION

Applicants incorporate by reference U.S. Pat. Nos. 5,730,880 and 5,504,124 for their prepolymer compositions. The preferred embodiment of the present invention enhances the commercial viability of the prepolymer composition technology described in the '880 and '124 patents. Applicants also incorporate by reference U.S. Pat. Nos. 6,793,098, 5,219,097, and 6,345,776 for their dispensing devices which are suitable for use in mixing and dispensing an embodiment of the prepolymer composition of the present invention.

One preferred embodiment of the polymer composition of the present invention is derived from the prepolymer composition disclosed in the '880 patent. The preferred embodiment of the polymer composition of the present invention is a modification of the '880 patent prepolymer composition.

The Prepolymer Composition of the '880 Patent

The '880 patent prepolymer composition has an NCO value of 2-10% by weight and preferably 5-10% by weight and being the reaction product obtained by reacting an excessive amount of a polymethylene polyphenylene polyisocyanate, comprising at least 25% by weight of 4,4'-diphenylmethane diisocyanate (4,4'-MDI) or a liquid variant thereof, with a polyether polyol having an average nominal hydroxyl functionality of from 2-4, a number average hydroxyl equivalent weight of from 500 to 3,000, and an oxyethylene content of at least 50% by weight.

The polyisocyanate used in making the prepolymer may be selected from polymethylene polyphenylene polyisocyanates comprising at least 25%, preferably at least 50% and most preferably at least 85% by weight of 4,4'-MDI or a liquid variant thereof. Preferably the polyisocyanate has an isocyanate functionality of 2.0 to 3.0, more preferably of 2.0 to 2.3, most preferably of 2.0 to 2.1.

As used herein, the term polymethylene polyphenylene polyisocyanates includes diphenylmethane diisocyanates and oligomers thereof, known in the art as crude or polymeric MDI, having an isocyanate functionality of greater than 2.

The polyisocyanate may consist essentially of pure 4,4'-MDI or mixtures of this diisocyanate with other diphenylmethane diisocyanate isomers, for example the 2,2'isomer optionally in conjunction with the 2,4'-isomer. The polyisocyanate may also be an MDI variant, derived from such a polyisocyanate, containing at least 25%, preferably at least 50% and most preferably at least 85% by weight of 4,4'-MDI. MDI variants are well known in the art and particularly include liquid products obtained by introducing uretonimine and/or carbodiimide groups into said polyisocyanates, such a carbodiimide and/or uretonimine modified polyisocyanate preferably having an NCO value of at least 25% by weight, and/or by reacting such a polyisocyanate with one or more polyols having a hydroxyl functionality of 2-6 and a molecular weight of 62-1,000 so as to obtain a modified polyisocyanate, preferably having an NCO value of at least 25% by weight. The polyisocyanate may comprise minor amounts of polymethylene polyphenylene polyisocyanates having an isocyanate functionality of greater than 2; this amount preferably is such that the isocyanate functionality of the total polyisocyanate is 2.0 to 2.5, more preferably 2.0 to 2.3, most preferably 2.0 to 2.1.

The polyol used in preparing the prepolymer preferably has an average nominal hydroxyl functionality of 2-4 and most preferably of 2.5-3.5, a number average hydroxyl equivalent weight of 500-3,000 and an oxyethylene content of from 50-85% by weight. The polyether polyols used in preparing the prepolymer include products obtained by the polymerization of ethylene oxide optionally together with another cyclic oxide like tetrahydrofuran, butylene oxide and—preferably—propylene oxide in the presence of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol and pentaerythritol. Mixtures of initiators may be used.

The polyol may be obtained by the simultaneous or sequential addition of ethylene oxide and the other cyclic oxide to the initiator. The sequential addition may be conducted in any order. Sequential addition will give polyols of the so-called block copolymer type. Simultaneous addition will give polyols of the so-called random type. Most preferred are random polyoxyethylene polyoxypropylene polyols having an oxyethylene content of 50-85% by weight.

In order to obtain the most preferred polyol having an average nominal hydroxyl functionality of 2.5-3.5, a polyol having a nominal hydroxyl functionality of 3 may be used or a mixture of polyols, which each may have another average nominal hydroxyl functionality provided the mixture is in the above 2.5-3.5 functionality range. The term "average nominal hydroxyl functionality" is used herein to indicate the average functionality (number of hydroxyl groups per molecule) of the polyol on the assumption that the average functionality of the polyoxyalkylene polyols present therein is identical with the average functionality (number of active hydrogen atoms per molecule) of the initiator(s) used in their preparation, although in practice it will often be somewhat less because of some terminal unsaturation. The term "average" refers to number average in the present specification.

The prepolymer is prepared conventionally by reacting the polyisocyanate and the polyol at relative amounts so as to obtain an NCO value of 2-10% and preferably 5-10% by weight at a temperature preferably between 40° and 100° C. The prepolymers so prepared are liquid at ambient conditions. The polyisocyanates, polyols, prepolymers and ways to prepare them are known as such; see e.g. EP-547765.

A Preferred Embodiment of Prepolymer Composition

As discussed previously, the above-described prepolymer composition of the '880 patent is very difficult to use commercially in the process of removing oil or water insoluble hydrocarbons from water or other material surface, because it is very hydroscopic and reacts quickly with moisture. One preferred embodiment of the present invention modifies the '880 patent prepolymer composition to make it commercially viable in spilled hydrocarbon clean up operations.

In a preferred embodiment of the present invention, the '880 patent prepolymer composition is modified by the use of one or a combination of the following so that the modified prepolymer equals 100 parts total:

a blowing agent, preferably a compressed fluorocarbon, such as HCFC-R22 (hydrogenated chlorofluorocarbon R22) or HFC-134a (hydrogenated fluorocarbon 134a) at a level of 1 to 50 parts, more preferably 8 to 30 parts. Hydrocarbons, such as propane, butane, etc., could also be used, although not as preferable.

The addition of a blowing agent or compressed gaseous expansion agent, such as fluorocarbon, more preferably a hydrogenated fluorocarbon, enhances the ability to commercially use the prepolymer technology. Suitable blowing agents include HCFC-R22 (chlorodifluoromethane), HFC-134a (1,1,1,2-tetrafluoroethane), and CFC-R12 (chlorofluorocarbon R12), among others. Preferably, the blowing agent used in the preferred embodiment is HCFC-R22 or HFC-134a, and more preferably HFC-134a. Although CFC-R12 is suitable, it is not preferred due to its reported deleterious effects to the earth's ozone layer. While HCFC-R22 is to be phased out of use by the year 2010, HFC-134a is environmentally friendly.

Other suitable blowing agents include Dymel® A (dimethyl ether, DuPont) and HFC-152a (1,1-difluoroethane), both of which are gaseous at 72° F. although flammable. Blends of Dymel® A or HFC-152a with HCFC-R22 or HFC-134a are used as propellants in the aerosol industry and may also be used in the present invention. Methyl formate, also known as methyl ester of formic acid, could be employed as a co-blowing agent, however, it is also flammable. Additionally, HFC-245fa (1,1,1,3,3-pentafluoropropane), designed to replace HCFC-141b (1,1-dichloro-1-fluoroethane), could also be used as a co-blowing agent with HCFC-R22 or HFC-134a.

The blowing agent provides several enhanced characteristics to the prepolymer, polymer foam and delivery system. The blowing agent reduces the viscosity of the prepolymer. It also acts as a frothing agent which aids in the mixing of the prepolymer with a water stream in a static mixer of a dispensing gun, thereby creating a froth polymer foam. Gaseous at room temperature and atmospheric pressure, the blowing agent is a propellant housed for ready use in a pre-pressurized container or cylinder. The blowing agent provides a propulsive force for shooting a stream of the polymer foam a greater distance.

optionally, a silicone cell control agent, such as Dow Corning® 5098 (Dow Corning Corporation) or NIAX® Y-10764 (General Electric Company) at a level of 0.01 to 6 parts, most preferably 1 to 2 parts. Although optional, the use of the cell control agent is preferred as it enhances the polymer cell structure or porosity, thus amplifying the sorption and/or encapsulation of the spilled material.

optionally, a diluent, preferably a water soluble or partially water soluble, isocyanate-compatible diluent, such as propylene carbonate, glycol ether DE acetate, glycol ether EM acetate, Fyrol® DMMP, Fyrol® CEF, Fyrol® PCF or triethylphosphate (TEP). TEP is preferred at a level of 1 to 50 parts, more preferably 15 to 40 parts.

The diluent or viscosity modifier is preferably isocyanate-compatible (non-reacting with the isocyanate) and preferably water soluble. The addition of an isocyanate-compatible, water soluble diluent lowers the viscosity of the prepolymer for processing without affecting the sorbing and/or encapsulating efficiency of the foamable prepolymer. TEP is the preferred diluent. In addition to being isocyanate-compatible and water soluble, TEP is also a flame retardant having approximately 40% phosphate content. The glycol ether DE acetate and glycol ether EM acetate are less desirable, because they are not as easy to use, have a complicated storage life and are somewhat flammable.

The addition of a diluent, particularly the selection of one infinitely soluble in water such as TEP, greatly improves the attraction between the spilled hydrocarbon material and the reacting prepolymer based upon visual observations. This improved "attraction" has been visually observed by comparing the use of non-water soluble diluents with the use of water soluble diluents, such as propylene carbonate or TEP.

While not preferred, isocyanate-compatible plasticizers, such as dioctyl phthalate, Mesamoll® (alkylsulfonic phenyl ester, Lanxess Corporation) or Santicizer® 160 (benzyl butyl phthalate, Ferro Corporation), may be used, however, they may have a lesser or even negative effect on the ability of the reacting prepolymer to sorb spillage.

A preferred embodiment of the present invention in which the '880 patent prepolymer composition is modified by the use of one or a combination of a blowing agent, a silicone cell control agent, and/or a diluent is presented in the following Table 1. The prepolymer, as modified, equals 100 parts total.

TABLE 1

| Component | Range (in Parts by Weight) | |
| --- | --- | --- |
|  | Preferably | More Preferably |
| '880 Prepolymer Composition | 30 to 70 | 45 to 55 |
| Blowing Agent | 1 to 50 | 8 to 30 |
| Silicone Cell Control Agent | 0.01 to 6 | 1 to 2 |
| Diluent | 1 to 50 | 15 to 40 |

Modifying the prepolymer in this manner provides the following advantages:

- The modified prepolymer may be packaged in pre-pressurized product containers or cylinders for use with disposable plastic dispensers requiring only a water source at the time of use.
- The ability to use a disposable plastic dispensing gun and disposable static mixer in a continuous or intermittent manner. The plastic dispensing gun can be used, then idled for weeks and still be ready for immediate use.
- The prepolymer composition of the present invention may be packaged in disposable product containers of varying sizes, for example, a five gallon container, and provided to the user as a kit, which would include the product tank, hose and dispensing gun assembly and nozzles. The user provides a water source and the kit is ready for use.
- No specially designed delivery system is required to dispense the polyurethane foam. The disposable dispensing gun and hose assembly suitable for dispensing the foam is the same delivery system commercially used to dispense other froth foam products.
- The modified prepolymer can be packaged in standard returnable and refillable cylinders or other standard containers.

Using the '880 patent prepolymer composition as a starting point, a preferred embodiment of the prepolymer composition of the present invention was obtained by adding 50 parts by weight of the combined diluent, blowing agent and control agent to 50 parts by weight of the '880 patent prepolymer.

The amount of modified prepolymer used being 1 to 300 parts by weight per 100 parts by weight of unwanted material, characterized in that the modified prepolymer is combined with 1-100 and preferably 2-60 parts by weight of water per part by weight of modified prepolymer at most 10 seconds, and more preferably at most 3 seconds before it is brought into contact with the materials. The modified prepolymer is combined with the water by intense impingement mixing within a small chamber followed by a static mixer, preferably disposable, or solely within a static mixer, preferably disposable, and immediately brought into contact with the unwanted materials.

The advantage of this type of dispensing technique is the reusable characteristic of the dispensing gun or unit and elimination of the need for extensive post-use cleaning of the dispensing gun. Only the disposable static mixer requires replacement between intermittent applications of the modified prepolymer—intermittent applications which may range in time from minutes, hours, days or even weeks between dispensing unit use. In contrast, the '880 patent teaches the use of a dispensing device, which requires the prepolymer and water to be combined to one supply before the nozzle of the device. Such a procedure requires extensive downtime between dispensing intervals for cleaning of the dispensing device due to the highly reactive characteristic of the prepolymer with water.

Further, the present invention is concerned with the use of water as a co-reacting component for a modified prepolymer having an NCO value of 2-10% by weight and being the reaction product obtained by reacting an excessive amount of polymethylene polyphenylene polyisocyanate comprising at least 25% by weight of 4,4'-MDI or a liquid variant thereof with a polyether polyol having an average nominal hydroxyl functionality of from 2 to 4, a number average hydroxyl equivalent weight of from 500 to 3,000, and an oxyethylene content of at least 50% by weight, the water being used in an amount of 1 to 100 parts by weight per part by weight of prepolymer. The prepolymer is modified using a gaseous blowing agent and compatible diluent to aid in dispensing as well as sorption and/or encapsulation performance.

In particular the process is useful for removing hydrocarbons from water.

The amount of modified prepolymer used may range from 1 to 300, more preferably from 10 to 100, and most preferably from 20 to 80 parts by weight per 100 parts by weight of unwanted material. In practice the amount of unwanted material may be estimated. If the estimated amount was too low, then the process may be repeated and if the estimated amount was too high, then some additional foam is formed.

The modified prepolymer and water mixture are preferably brought into contact with the spilled materials using spraying techniques associated with the use of gaseous blowing agents. If desired, the modified prepolymer may be mixed directly with the materials. The modified prepolymer is allowed to react preferably under ambient conditions. The process can even be applied at low ambient temperature, as long as sufficient—liquid—water is present. The modified prepolymer reacts with part of the water to form a flexible foam and the reaction is generally complete in 1 to 15 minutes. The foam obtained contains the unwanted material through sorption and/or encapsulation. The flexible foam with the unwanted material is then collected and the flexible foam is removed from the wanted material in any known way. The flexible foam, after being removed, may be subsequently dried and cut into smaller pieces and/or compressed. The collected foam, preferably after drying, may then be used for energy recovery.

The present invention is illustrated by the following examples.

EXAMPLE 1

A prepolymer was prepared by reacting 30 parts by weight of 4,4'-MDI and 70 parts by weight of an ethylene/propylene oxide (EO/PO) polyol having a molecular weight of 3,000, a nominal functionality of 3 and EO content of 75% by weight (random). The NCO-value of the prepolymer was 7.8% by weight (Prepolymer 1). Fifty parts by weight of Prepolymer 1 was blended with 50 parts by weight HFC-134a in a suitable pressure container. A plastic disposable dispensing gun with fifteen feet of hose was used to evaluate the resultant Prepolymer 1 blend. One product hose of the dispensing gun was connected to the pressure container and a second hose was connected to a water source. The Prepolymer 1 blend and water were mixed via a static mixer upon dispensing gun activation. A suitable target container measuring 20" wide× 40" long×21" deep was selected to evaluate the blended Prepolymer 1. The target container was filled approximately ⅔ full of water and 1.5 liters of used motor oil was deposited onto the surface of the water. The measured throughput of the dispensing gun was 7.0 pounds per minute and approximately 2.0 pounds of homogeneous mixed blended Prepolymer 1 and water were sprayed onto the target surface. The resultant flexible foam exhibited a very coarse cell structure and sorbed and/or encapsulated approximately 50% of the used motor oil. The high level of gaseous blowing agent caused incomplete mixing in the static mixer as well as airborne polymer particles.

COMPARATIVE EXAMPLE 2

Fifty parts by weight of Prepolymer 1 was blended with 15 parts by weight of Santicizer® 160 and 35 parts by weight of HFC-134a in a suitable pressure container. The blended Prepolymer 1 was evaluated in the same manner as referenced in Example 1. The level of gaseous blowing agent was deemed to be excessive, although a noted improvement over the dispensing characteristics observed in Example 1, and the foam cell structure was less coarse than in Example 1. Although the use of the Santicizer® 160 aided in reducing the blend viscosity, the non-water soluble plasticizer repelled the oil, thereby resulting in approximately 50% sorption and/or encapsulation of the used motor oil.

COMPARATIVE EXAMPLE 3

Fifty parts by weight of Prepolymer 1 was blended with 25 parts by weight of propylene carbonate (20-25% by weight soluble in water) and 25 parts by weight of HFC-134a in a suitable pressure container. The blended Prepolymer 1 was evaluated in the same manner as referenced in Example 1. A uniform polymer spray pattern was achieved with a medium to coarse cell structure in the reacted polymer. No apparent repelling of the motor oil was observed with approximately 75% sorption and/or encapsulation of the used motor oil.

COMPARATIVE EXAMPLE 4

Fifty parts by weight of Prepolymer 1 was blended with 24.5 parts by weight of TEP (completely water soluble), 24.5 parts by weight of HFC-134a and 1.0 part by weight of NIAX® Y-10764. The blended Prepolymer 1 was evaluated in the same manner as referenced in Example 1. The polymer spray pattern was acceptable and resulted in a medium to fine cell structure in the reacted polymer. An increased attraction of the oil was noted and resulted in 100% sorption and/or encapsulation of the used motor oil.

Having described the invention above, various modification of the techniques, procedures, materials and equipment will be apparent to those in the art. It is intended that all such variations within the scope and spirit of the appended claims be embraced thereby.

We claim:

1. A process for removing hydrocarbon material from wanted material comprising the steps of:
    obtaining a prepolymer, said prepolymer having an NCO value of 2-10% by weight and being the reaction product obtained by reacting an excessive amount of polymethylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight,
    blending a compressed gas with said prepolymer to create a modified prepolymer, said compressed gas being a propellant,
    mixing said modified prepolymer with water in a static mixer, characterized in that the modified prepolymer is mixed with 1-100 parts by weight of the water per part weight of the modified prepolymer, said compressed gas providing necessary turbulence in said static mixer to achieve a satisfactory mix,
    bringing the mixed modified prepolymer and water composition into contact with the materials within 10 seconds of mixing;
    allowing the prepolymer to react with at least part of the water to form a flexible foam; and
    removing the foam obtained from the wanted material.

2. The process of claim 1, wherein a diluent is further blended with the prepolymer to reduce viscosity.

3. The process of claim 2, wherein the diluent is at least a partially water soluble, isocyanate-compatible diluent.

4. The process of claim 2, wherein the diluent is propylene carbonate, glycol ether DE acetate, glycol ether EM acetate, dimethyl methyl phosphonate, tri(2-chloroethyl)phosphate, tri(2-chloroisopropyl)phosphate or triethylphosphate.

5. The process of claim 2, wherein up to 70 parts by weight of the combined compressed gas and diluent are blended with the prepolymer.

6. The process of claim 5, wherein said parts by weight of the combined compressed gas and diluent are comprised of 8 to 30 parts compressed gas and 15 to 40 parts diluent.

7. The process of claim 1, wherein a cell control agent is further blended with the prepolymer to enhance the polymer cell structure.

8. The process of claim 2, wherein a cell control agent is further blended with the prepolymer to enhance the polymer cell structure.

9. The process of claim 8, wherein up to 70 parts by weight of the combined compressed gas, diluent and cell control agent are blended with the prepolymer.

10. The process of claim 9, wherein said parts by weight of the combined blowing agent, diluent and cell control agent are comprised of 8 to 30 parts blowing agent, 15 to 40 parts diluent and 1 to 2 parts cell control agent.

11. A polymer foam composition adapted for spraying on a hydrocarbon material and a wanted material in the presence of water to remove the hydrocarbon material from the wanted material, the polymer foam composition comprising:
    a prepolymer having an NCO value of 2-10% by weight and being the reaction product obtained by reacting an excessive amount of polymethylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight; and
    modifying said prepolymer with a blowing agent.

12. The polymer foam composition of claim 11, further modifying said prepolymer with a diluent.

13. The polymer foam composition of claim 12, wherein the diluent is at least a partially water soluble, isocyanate-compatible diluent.

14. The polymer foam composition of claim 12, wherein the diluent is propylene carbonate, glycol ether DE acetate, glycol ether EM acetate, dimethyl methyl phosphonate, tri(2-chloroethyl)phosphate, tri(2-chloroisopropyl)phosphate or triethylphosphate.

15. The prepolymer foam composition of claim 12, wherein said modified prepolymer includes up to 70 parts by weight of the combined blowing agent and diluent.

16. The prepolymer foam composition of claim 15, wherein said parts by weight of the combined blowing agent and diluent are comprised of 8 to 30 parts blowing agent and 15 to 40 parts diluent.

17. The polymer foam composition of claim 11, further modifying said prepolymer with a cell control agent.

18. The polymer foam composition of claim 12, further modifying said prepolymer with a cell control agent.

19. The polymer foam composition of claim 18, wherein said modified prepolymer includes up to 70 parts by weight of the combined blowing agent, diluent and cell control agent.

20. The prepolymer foam composition of claim 19, wherein said parts by weight of the combined blowing agent, diluent and cell control agent are comprised of 8 to 30 parts blowing agent, 15 to 40 parts diluent and 1 to 2 parts cell control agent.

* * * * *